(12) United States Patent
Ferguson

(10) Patent No.: US 9,067,176 B2
(45) Date of Patent: Jun. 30, 2015

(54) SPECIALIZED AMMONIA INJECTION GRID WITH THE DUAL PURPOSE OF SUPPRESSING NOISE

(71) Applicant: Honeywell International, Inc., Morristown, NJ (US)

(72) Inventor: Christopher Ferguson, Tulsa, OK (US)

(73) Assignee: HONEYWELL INTERNATIONAL, INC., Morristown, NJ (US)

( * ) Notice: Subject to any disclaimer, the term of this patent is extended or adjusted under 35 U.S.C. 154(b) by 207 days.

(21) Appl. No.: 13/834,661

(22) Filed: Mar. 15, 2013

(65) Prior Publication Data

US 2015/0041014 A1    Feb. 12, 2015

(51) Int. Cl.
*B01D 53/90* (2006.01)
*B01D 53/94* (2006.01)

(52) U.S. Cl.
CPC ................................. *B01D 53/9418* (2013.01)

(58) Field of Classification Search
CPC ..... B01D 53/9418; F01N 1/24; F01N 3/2066; F01N 3/2885
USPC .......... 422/168, 172, 177; 181/220, 221, 222, 181/252, 256, 257, 259, 261; 239/602, 239/DIG. 19; 60/295, 301
See application file for complete search history.

(56) References Cited

U.S. PATENT DOCUMENTS

| | | | |
|---|---|---|---|
| 6,442,933 B2 | 9/2002 | Rusch | |
| 7,638,107 B1 * | 12/2009 | Wirt et al. | ...................... 422/172 |
| 7,703,574 B2 | 4/2010 | Kruger et al. | |
| 8,017,084 B1 | 9/2011 | Wirt et al. | |
| 2010/0242451 A1 | 9/2010 | Werni et al. | |

FOREIGN PATENT DOCUMENTS

WO    2008006383 A1    1/2008

OTHER PUBLICATIONS

Simple Cycle Turbine Emissions by Improved AIG Distribution; Reinke, Peter Power Engineering, (What Works), vol. 114, Issue 11 (Nov. 2010).

* cited by examiner

*Primary Examiner* — Jill Warden
*Assistant Examiner* — Joye L Woodard

(57) ABSTRACT

An ammonia injection grid covered with sound adsorption material for a selective catalytic reduction (SCR) system that provides uniform distribution of ammonia to the SCR catalyst in $NO_X$-reduction systems and provides noise suppression for heat recovery steam generation systems, packaged boilers, simple cycle catalyst systems and fired heaters for superior operational efficiency. The ammonia injection grid covered with sound adsorption material includes an injection tube having at least one nozzle for injecting ammonia into a flow of flue gas. The ammonia injection grid also includes a corrugated turbulence enhancer covered with sound adsorption material associated with the injection tube to generate turbulent wake to enhance turbulent mixing and noise suppression.

38 Claims, 8 Drawing Sheets

SPECIALIZED AMMONIA INJECTION GRID WITH THE DUAL PURPOSE OF SUPPRESSING NOISE

FIELD OF THE INVENTION

This invention relates generally to an ammonia injection grid for a selective catalytic reduction (SCR) system that provides distribution of ammonia to the SCR catalyst in $NO_X$ reduction systems for heat recovery steam generation systems, packaged boilers, simple cycle catalyst systems and fired heaters and provides noise suppression to eliminate the need for a muffler in the exhaust stack to provide superior operational efficiency.

DESCRIPTION OF THE RELATED ART $NO_X$ refers to the cumulative emissions of nitric oxide (NO), nitrogen dioxide ($NO_2$) and trace quantities of other chemicals during combustion which are environmentally hazardous substances. Combustion of fossil fuels generates some level of $NO_X$ due to high temperatures and availability of oxygen and nitrogen from both the fuel and air. $NO_X$ emissions may be controlled using low $NO_X$ combustion technology and postcombustion techniques, such as selective catalytic reduction (SCR). SCR systems catalytically reduce flue gas $NO_X$ to nitrogen and water using ammonia ($NH_3$) in a chemical reaction.

SCR systems treat the $NO_X$ before the gas is released into the atmosphere. SCR systems rely on a catalyst to treat flue gas as the gas passes through the SCR system. Because the catalyst is an integral part of the SCR chemical reaction, SCR systems attempt to provide maximum exposure of the catalyst to the flue gas in order to ensure that all the flue gas comes sufficiently into contact with the catalyst for treatment.

The catalysts used in SCR systems are carefully engineered and expensive. Thus it is beneficial to be able to control the stoichiometry of the exhaust gas/ammonia/catalyst reaction. In SCR systems, the ammonia is typically introduced into the flue gas stream using an injection grid comprised of injection tubes having a plurality of injection ports or nozzles. The injection grid is designed to provide an even distribution of ammonia throughout the flue gas. The particular injection grid configuration and size utilized within the SCR system is based upon the size of the flue conveying the flue gas stream, as well as the distance from the injection grid to the inlet of the catalyst bed of the SCR. A long distance between the injection grid and the SCR catalyst must typically be provided to assure acceptable turbulent mixing of the ammonia and flue gas. Longer distances require fewer ammonia injectors since adequate mixing can occur prior to the mixture of the flue gas and ammonia entering the SCR catalyst bed. Shortening the distance between the injection point and the catalyst is often desirable, and in new constructions a long distance is often unavailable due to a limited footprint for the ductwork. In a retrofit application, a long distance may require cost prohibitive modifications to the existing system.

Commonly ammonia, as a reducing agent, is injected and distributed through the injection grid into the flow of flue gas. The nozzles on the injection grid are typically arranged so as to inject the ammonia into and parallel with the flue gas and toward the catalyst located downstream. Ammonia in commonly injected through the injection grid into the flow of flue gas by utilizing an external ammonia vaporization system wherein liquid ammonia, either in an anhydrous or aqueous state, is vaporized in a heater or vaporizer, mixed with dilution air, and then routed to the injection grid for injection into the flow of flue gas at a location upstream of the SCR system. Typically, the ammonia is diluted with water prior to being injected through the injection grid into the flow of flue gas.

Ammonia injection grids with zone controls have been installed to distribute a prescribed amount of ammonia for $NO_X$ reducing SCR systems. To increase the mixing efficiency and reduce the required mixing distance, many SCR installations are equipped with static mixers. Static mixers typically utilize elaborate designs, are difficult to fabricate, have higher construction and installation costs, and cause significantly higher pressure drop. Static mixers are typically installed between the ammonia injection grid and the SCR catalyst; however, deflectors or baffles attached to the injection nozzles or turbulence enhancers installed between the injection tubes have also been utilized.

In the exhaust gas stack there is generally a need for noise suppression. Typically, a muffler, also called a silencer, is included in the exhaust gas stack for noise suppression downstream of the ammonia injection grid and the SCR catalyst unit to provide the required noise suppression. The muffler adds length to the exhaust gas stack, increases exhaust stack system costs and increases the pressure drop in the stack.

It is therefore desirable to provide an ammonia injection grid for a SCR system that provides unified distribution of ammonia to the SCR catalyst in $NO_X$ reduction systems while providing noise suppression without a muffler.

It is further desirable to provide an ammonia injection grid utilizing a novel turbulence enhancer associated with the downstream side of the injection tubes while providing noise suppression without a muffler.

It is still further desirable to provide an ammonia injection grid utilizing turbulence enhancers installed on the downstream side of the injection tubes that may be retrofitted to existing ammonia injection grids while providing noise suppression without a muffler.

It is yet further desirable to provide an ammonia injection grid utilizing a corrugated turbulence enhancer attached to the downstream side of the injection tubes of the ammonia injection grid to provide unified distribution of ammonia to the SCR catalyst while providing noise suppression without a muffler.

SUMMARY OF THE INVENTION

In general, the invention relates to an ammonia injection grid including an injection tube having at least one nozzle for injecting ammonia into a flow of flue gas having sound adsorption material received on the outside of the injection tube such that the sound adsorption material allows the nozzle to inject ammonia into the flow of flue gas while providing noise suppression. The injection tube extends generally transverse to the flow of flue gas. The sound adsorption material may be a porous material or may be a combination of perforated metal material over the porous material. The invention provides the dual purpose of injecting ammonia upstream of the SCR catalyst and suppressing noise in the exhaust gas stack.

Another embodiment of the invention relates to an ammonia injection grid including an injection tube having at least one nozzle for injecting ammonia into a flow of flue gas, a plurality of horizontal baffle plates upstream of the ammonia injection grid and sound adsorption material received on the outside of the baffles and the injection tube such that the sound adsorption material allows the nozzle to inject ammonia into the flow of flue gas while providing noise suppression.

In yet another embodiment of the invention, the invention relates to an ammonia injection grid including an injection tube having at least one nozzle for injecting ammonia into a flow of flue gas, a corrugated turbulence enhancer associated with the injection tube to generate turbulent wake to enhance turbulent mixing and sound adsorption material received on the outside of the injection tube and the corrugated turbulence enhancer such that the sound adsorption material allows the nozzle to inject ammonia into the flow of flue gas while providing noise suppression. The injection tube may be a plurality of elongated, circular injection tubes aligned in parallel, with each injection tube having a plurality of nozzles. Further, the corrugated turbulence enhancer may be a plurality of corrugated turbulence enhancers associated with each injection tube.

Each nozzle of the ammonia injection grid may form an approximate 75 degree angle relative to the upstream flow of flue gas. Further, the ammonia injection grid comprises a plurality of ammonia injection grid panels, such as at least one upper ammonia injection grid panel and at least one lower injection grid panel. The ammonia injection grid can also include an upper header and a lower header in fluid communication with the injection tube for supplying ammonia to the injection tube. The upper header and the lower header may be provided with a substantially V-shaped baffle plate to further increase the mixing efficiency of the ammonia injection grid. The substantially V-shaped baffle plate of the upper header and the lower header may form an approximate 44 degree angle relative to the flow of flue gas. The ammonia injection grid may include a nozzle in the upper header and a nozzle in the lower header, wherein the nozzle of the upper header and the nozzle of the lower header inject ammonia substantially perpendicular to the flow of flue gas.

The corrugated turbulence enhancer of the ammonia injection grid may be associated with the downstream side of the injection tube. The corrugated turbulence enhancer may include a first trailing end and a second trailing end connected to a substantially V-shaped middle section. An apex of the substantially V-shaped middle section may form a trailing middle section, while the injection tube may be associated with a furrow of the substantially V-shaped middle section of the corrugated turbulence enhancer. Additionally, the first trailing end and the second trailing end of the corrugated turbulence enhancer may form an approximate 32 degree angle relative to the flow of flue gas. The corrugated turbulence enhancer may be substantially M-shaped in cross section. The corrugated turbulence enhancer may include a first leading end joined to the first trailing end and a second leading end joined to the second trailing end 64. The corrugated turbulence enhancer may be in the form of three (3) contiguous, substantially V-shaped sections.

Other advantages and features will be apparent from the following description, and from the claims.

DETAILED DESCRIPTION OF THE INVENTION

The devices and methods discussed herein are merely illustrative of specific manners in which to make and use this invention and are not to be interpreted as limiting in scope.

While the devices and methods have been described with a certain degree of particularity, it is to be noted that many modifications may be made in the details of the construction and the arrangement of the devices and components without departing from the spirit and scope of this disclosure. It is understood that the devices and methods are not limited to the embodiments set forth herein for purposes of exemplification.

Figure 1:
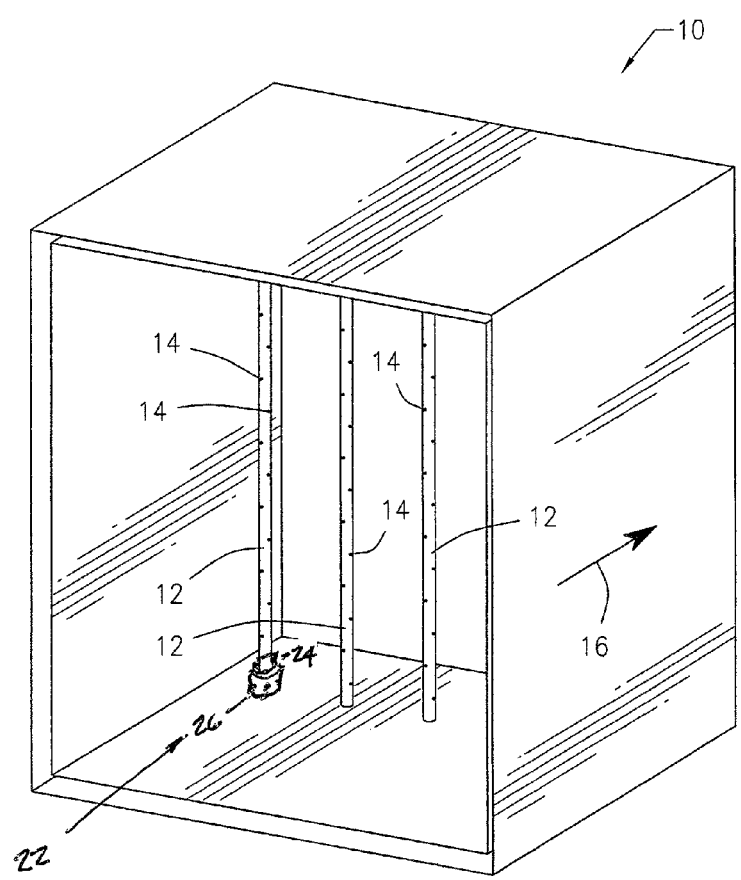
FIG. 1 is a perspective view of an ammonia injection grid utilizing circular injection tubes covered with sound adsorption material having a plurality of injection nozzles for injecting ammonia into the flow of flue gas and providing noise suppression.
Figure 7:
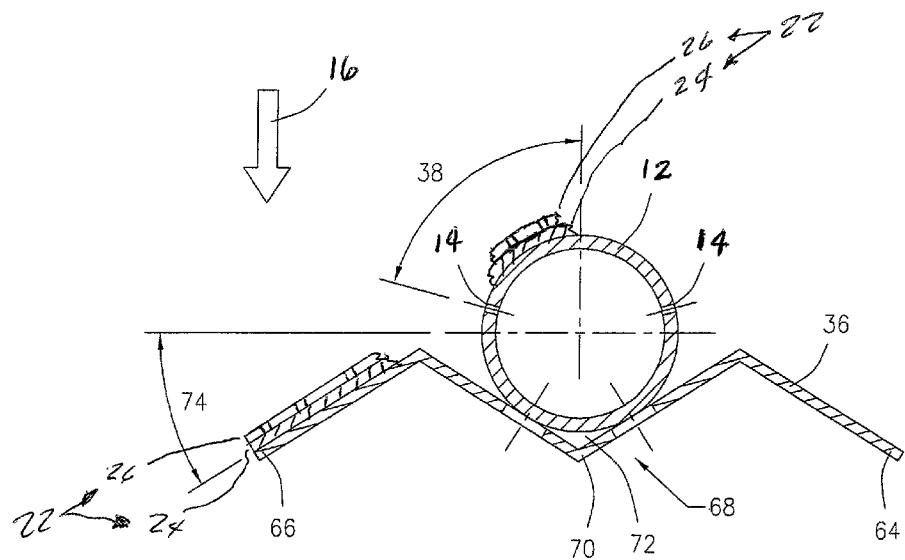
FIG. 7 is a cross section view along line 7-7 of the ammonia injection grid panel covered with sound adsorption material shown in FIG. 5.
Figure 8:
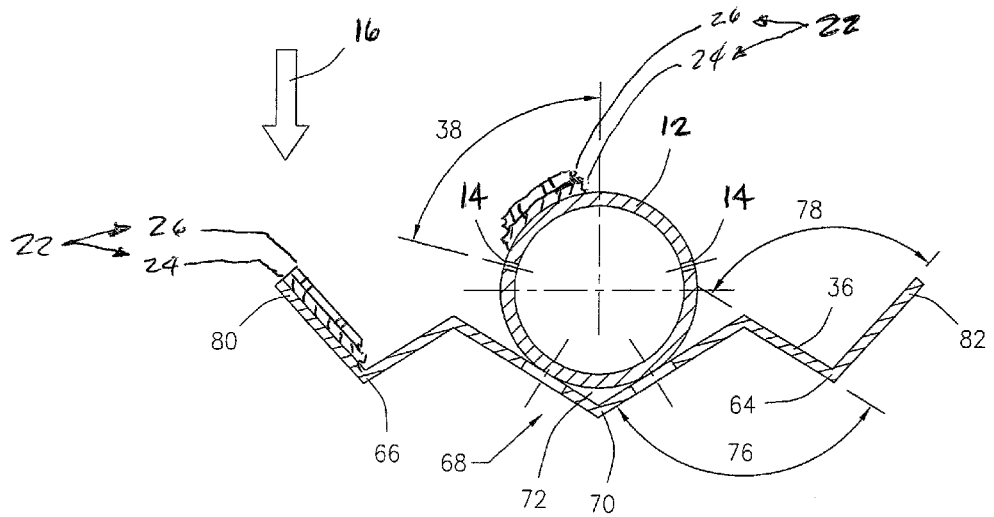
FIG. 8 is a cross section view of another example of a corrugated turbulence enhancer in accordance with an illustrative embodiment of the ammonia injection grid covered with sound adsorption material for selective catalytic reduction systems disclosed herein.
Figure 9:
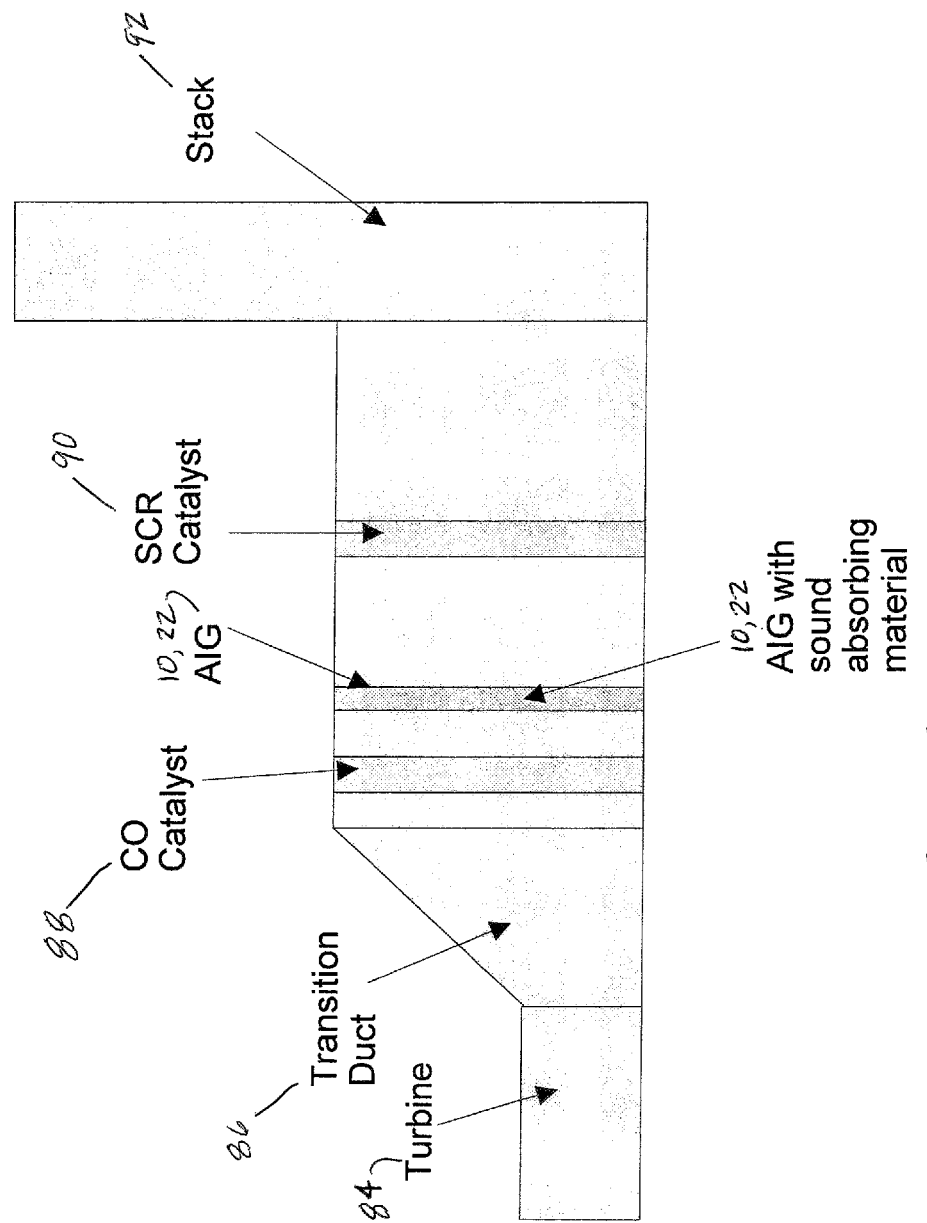
FIG. 9 illustrates an exhaust gas stack configuration with the ammonia injection grid covered with sound adsorption material for selective catalytic reduction systems disclosed herein.

Referring now to FIGS. 1 through 10, wherein like numerals of reference designate like elements throughout the several views, and initially to referring to FIG. 1, a perspective view of an ammonia injection grid (AIG) 10 utilizing a plurality of circular injection tubes 12 having a plurality of injection nozzles 14. The AIG 10 is upstream of the SCR catalyst 90 as shown in FIG. 9. The injection nozzles 14 along the length of the circular injection tubes 12 direct diluted ammonia into the flow of flue gas 16. The injected diluted ammonia is mixed with the flue gas by turbulent wake created by the injection tubes. The injection tubes 12 are covered by sound adsorption material 22 to provide noise suppression so that the exhaust gas stack 92 does not require the use of a muffler as disclosed in FIG. 9. By eliminating the need for a muffler in the exhaust gas stack 92, the exhaust gas stack requires less space, is less expensive and has less pressure loss for a more effective exhaust system. The sound adsorption material can be porous material 24 or a combination of porous material 24 covered by perforated metal material 26. The porous material 24 for sound adsorption would include amorphous wool such as alcaline-earth-silicate (AES) wool or aluminium-silicate (ASW) wool, polycrystalline (PCW)

wool such as alumina wool, amorphous paper, PCW paper, polyurethane, elastomeric foam, open-celled polymeric foam or a combination of amorphous wool, PCW wool, amorphous paper, PCW paper, polyurethane, elastomeric foam or open-celled polymeric foam. Some of the porous materials 24 could be used when flue gas temperatures are as high as 1000° C. (1800° F.) while others would require injection of cool air to lower flue gas temperatures to 150° C. (300° F.). Various methods may be used to situate the porous material 24 along the exterior surfaces of the tubes 12 without covering the nozzles 14 such as coating, fusing, dipping, gluing, wrapping, pinning, taping or strapping. Perforated metal material 26 for sound adsorption can be used to cover the porous material 24 to enhance sound suppression. Various methods may be used to situate the perforated materials 26 along the exterior surface of the porous material 24 such as coating, welding, soldering, brazing, fusing, dipping, gluing, wrapping, pinning or strapping.

Figure 2:
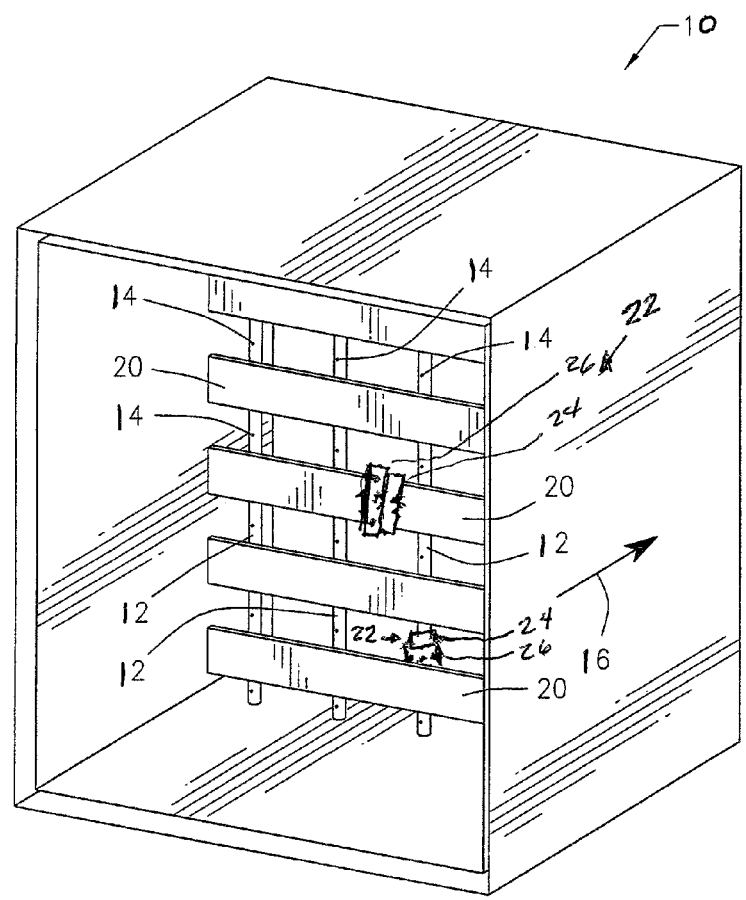
FIG. 2 is a perspective view of an ammonia injection grid utilizing a plurality of circular injection tubes having a plurality of injection nozzles and a plurality of horizontal baffle plates attached to the upstream side of the injection tubes for creating turbulent mixing of the ammonia and the flue gas where the tubes and baffles are covered with sound adsorption material to provide noise suppression.

FIG. 2 is a perspective view of another embodiment of the ammonia injection grid 10 utilizing a plurality of horizontal baffle plates 20 attached to the upstream side of the injection tubes 12 for creating turbulent mixing of the ammonia and the flue gas. The AIG 10 of FIG. 2 is comprised of a plurality of injection tubes 12 each having a plurality of nozzles 14. The nozzles 14 are arranged so as to inject the diluted ammonia into the flow of the flue gas 16 prior to entering the SCR catalyst 90 (not shown) located downstream. The ammonia supplied to the injection tubes 12 may be via headers 46.48 (not shown). The plurality of horizontal baffle plates 20 are attached to the upstream side of the injection tubes 12 for creating a wake to increase the turbulent mixing between the ammonia and the flue gas. The horizontal baffle plates 20 have sound adsorption material situated along the external surface of said baffle plates to enhance the noise suppression capabilities of the AIG 10. The sound adsorption material can be porous material 24 or a combination of porous material 24 covered by perforated metal material 26.

Figure 3:
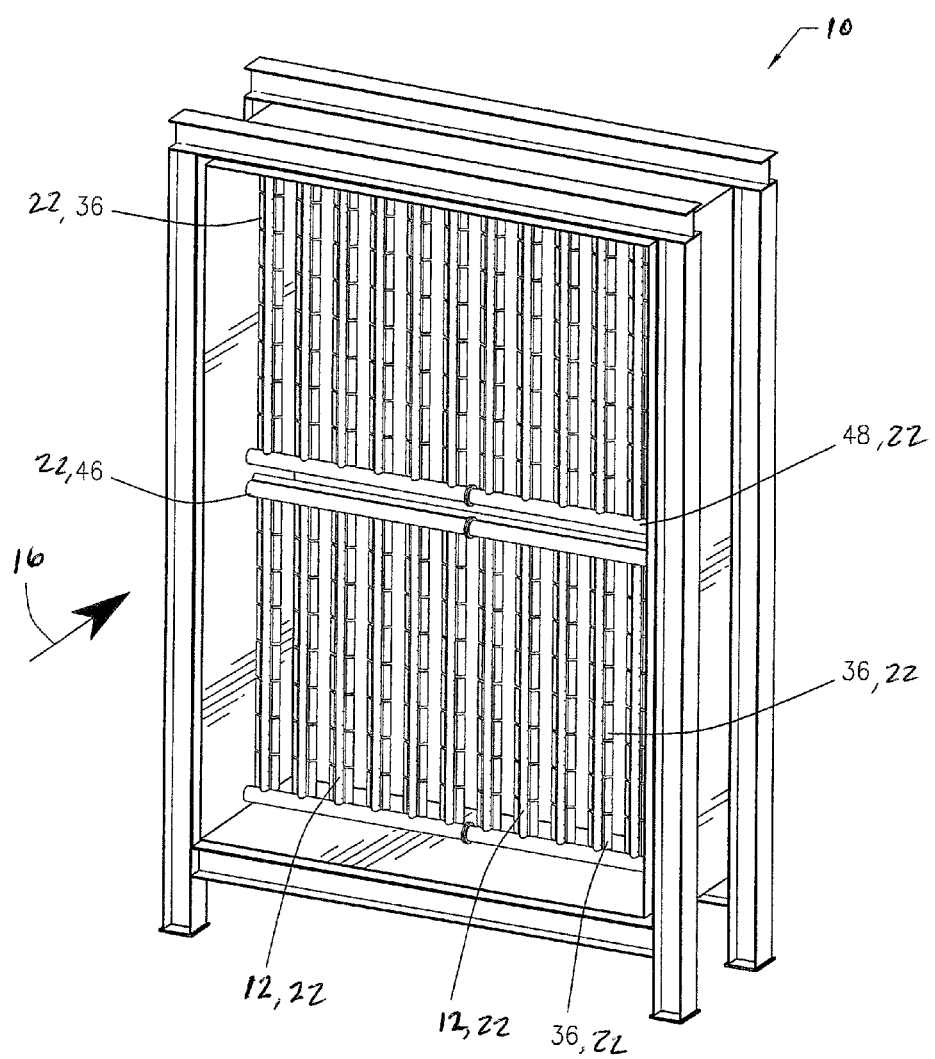
FIG. 3 is a perspective view of an example of an ammonia injection grid covered with noise adsorption material in accordance with an illustrative embodiment of the ammonia injection grid for selective catalytic reduction systems disclosed herein.
Figure 4:
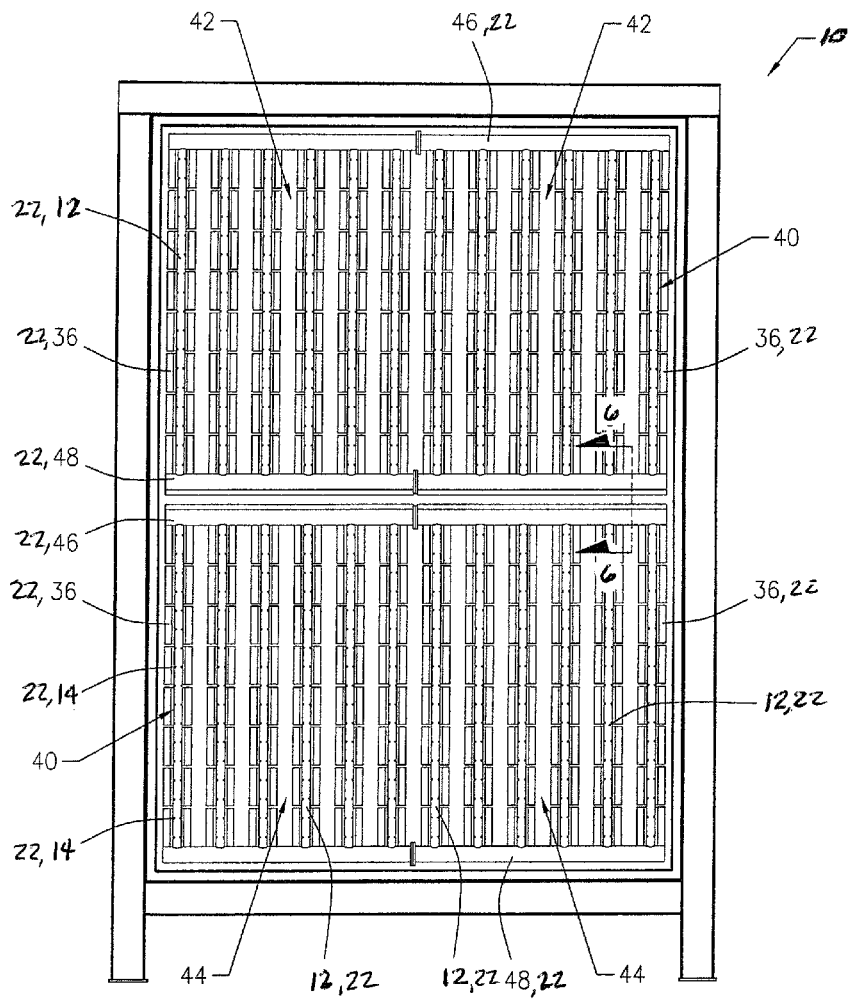
FIG. 4 is an elevation view looking upstream of an example of an ammonia injection grid covered with sound adsorption material in accordance with an illustrative embodiment of the ammonia injection grid for selective catalytic reduction systems disclosed herein.
Figure 5:
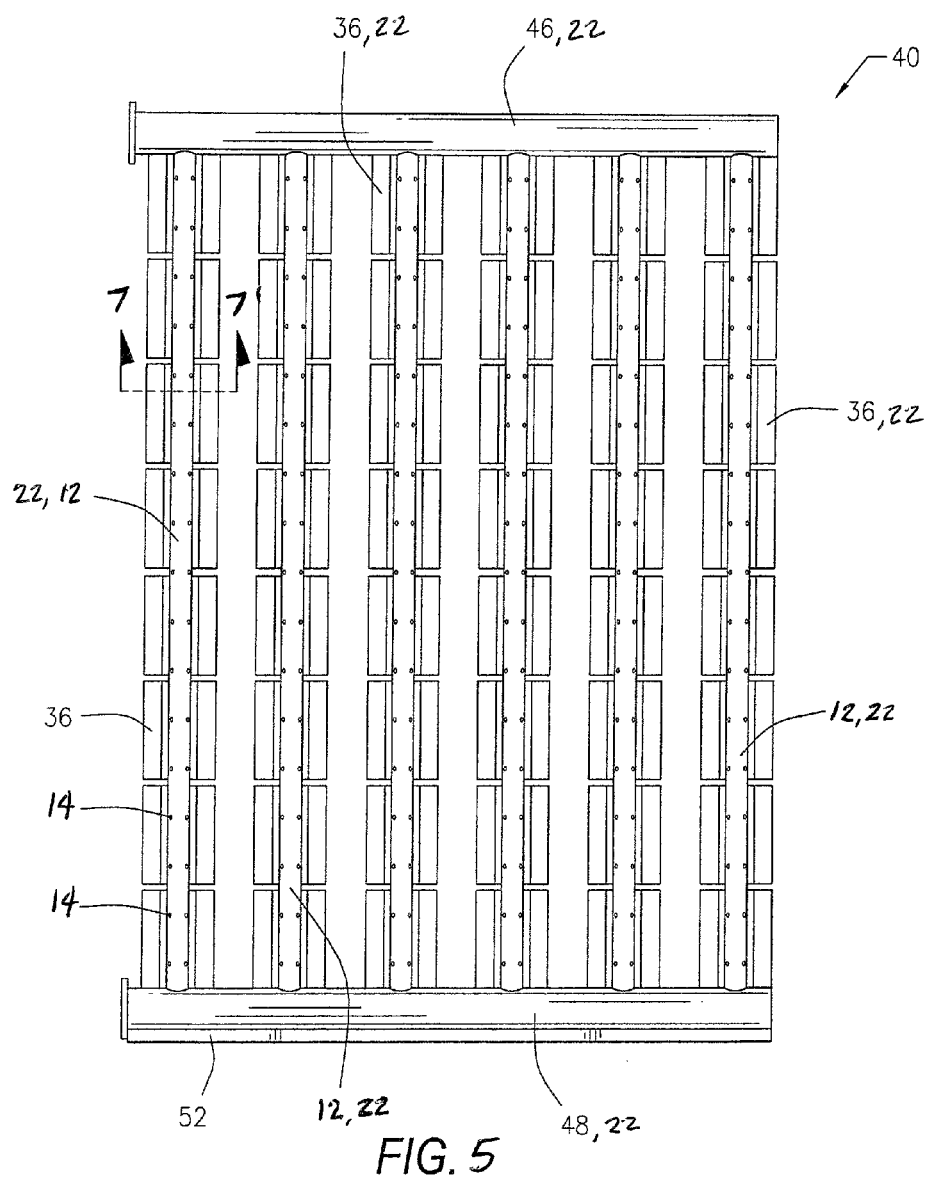
FIG. 5 is an elevation view looking upstream of an ammonia injection grid panel covered with sound adsorption material in accordance with an illustrative embodiment of the ammonia injection grid for selective catalytic reduction systems disclosed herein.

FIG. 3 is a perspective view and FIG. 4 is an elevation view looking upstream of an ammonia injection grid 10 having at least one injection tube 12 with at least one nozzle 14 for injecting ammonia into the flow of flue gas 16. Each injection tube 12 extends generally transverse to the flow of flue gas, depicted by arrow, 16 and includes at least one corrugated turbulence enhancer 36 associated therewith to generate a turbulent wake downstream of the injection to enhance mixing of the injected ammonia and flue gas. Both the injection tube 12 and the corrugated turbulence enhancer 36 have sound adsorption material 22 being situated along their external surfaces for enhanced noise suppression such that a muffler is not required in the exhaust gas stack 92. The sound adsorption material 22 can be porous material 24 or a combination of porous material 24 covered by perforated metal material 26. The AIG 10 may include a plurality of injection tubes 12, with each injection tube 12 having a plurality of nozzles 14. The nozzles 14 may form an upstream angle 38 relative to the flow of flue gas 16, such as an approximate seventy-five (75) degree angle opposite to the flow of flue gas 16. Each of the injection tubes 12 may have a plurality of corrugated turbulence enhancers 36 associated therewith. The injection tubes 12 may be vertical and in parallel alignment. However, those skilled in the art will appreciate that other alignments and arrangements may be used with the AIG 10, such as horizontal or diagonal. As shown, the injection tubes 12 are aligned along the same plane, but may also be in a staggered arrangement.

As shown in FIG. 4, the AIG 10 may include a plurality of ammonia injection panels 40, such as at least one upper ammonia injection panel 42 and at least one lower ammonia injection panel 44 adjacent each other. Each ammonia injection panel 40 may include an upper header 46 and a lower header 48, with a plurality of elongated, circular injection tubes 12 disposed there between. The upper header 46 and the lower header 48 have sound adsorption material 22 being situated along their external surfaces for enhanced noise suppression. The sound adsorption material 22 can be porous material 24 or a combination of porous material 24 covered by perforated metal material 26.

Figure 6:
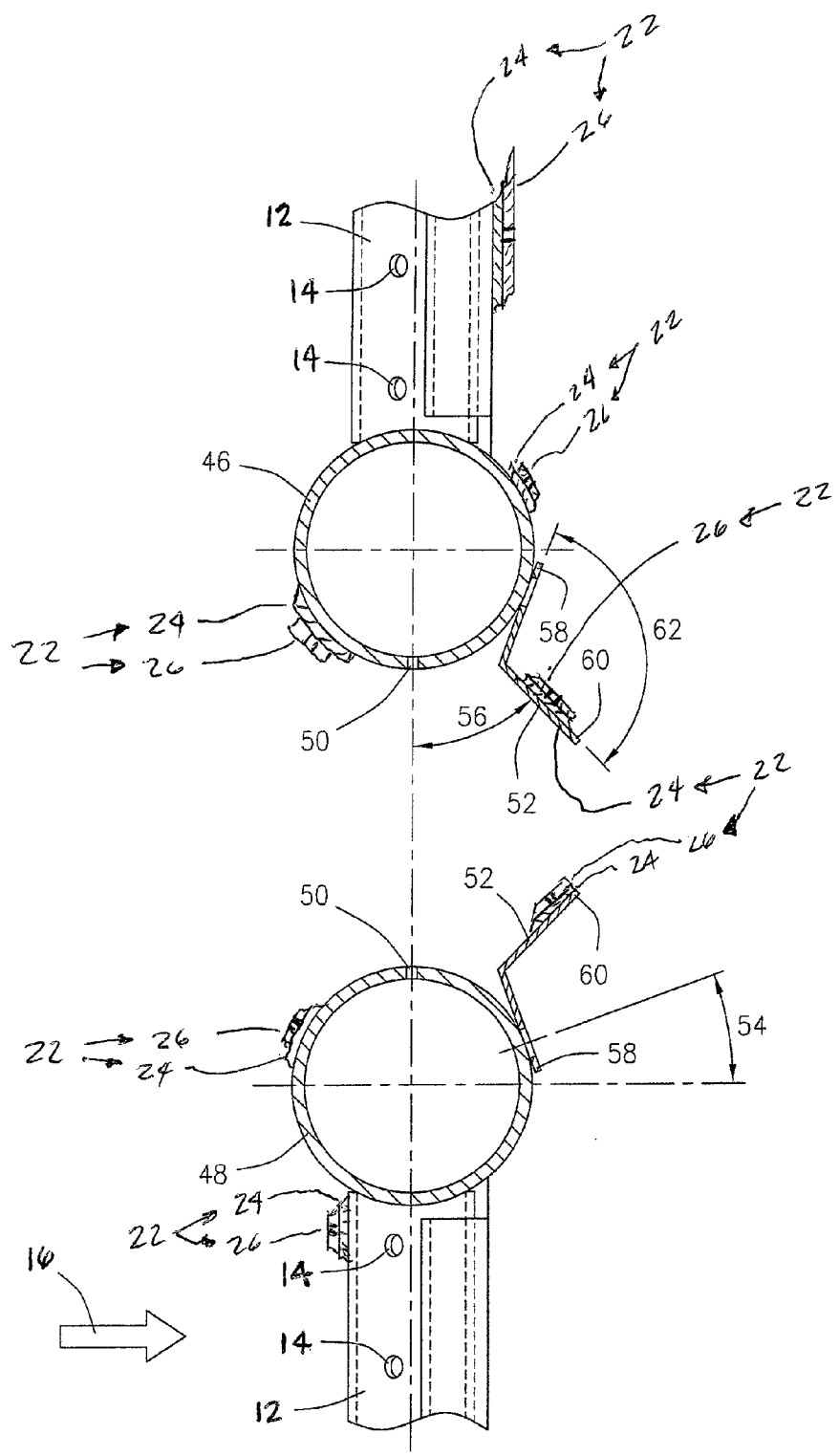
FIG. 6 is a cross section view along line 6-6 of the ammonia injection grid covered with sound adsorption material shown in FIG. 4.

The AIG 10 may include headers, such as at least one upper header 46 and at least one lower header 48, in fluid communication with the injection tubes 12 to supply ammonia from an ammonia vaporizer or heater (not shown) to each of the injection tubes 12. Further, the AIG 10 may be integrated into an SCR system (not shown). Each of the headers 46 and 48 may include at least one nozzle 50. Each of the nozzles 50 may inject ammonia substantially perpendicular to the flow of the flue gas 16. The headers 46 and 48 may also include at least one baffle plate 52 to further increase the mixing efficiency of the injected ammonia and flue gas. The baffle plate 52 associated with each of the headers may be a substantially V-shaped baffle plate 52. As shown in FIG. 6, the substantially V-shaped baffle plate may be associated with the downstream side of the header 46 or 48. The substantially V-shaped baffle plate 52 may be secured to the header 46 or 48 at an angle 54, and may also form an angle 56, for example approximate forty-four (44) degrees, with the nozzle 50 of the header 46 or 48, as shown in FIG. 6. The opposing ends 58 and 60 of the substantially V-shaped baffle plate 52 of the header 46 or 48 may form an angle 62, for example approximately one-hundred and sixteen (116) degrees. The substantially V-shaped baffle plate 52 associated with the header 46 or 48 acts in conjunction with the corrugated turbulence enhancer 36 for uniform distribution of ammonia and flue gas prior to flowing to the downstream SCR catalyst 92. The substantially V-shaped baffle plates 52 have sound adsorption material 22 being situated along their external surfaces for enhance noise suppression. The sound adsorption material 22 can be porous material 24 or a combination of porous material 24 covered by perforated metal material 26.

The corrugated turbulence enhancer 36 associated with each of the injection tubes 12 of the AIG 10 may be associated with the downstream side of each injection tube 12. Turning now to FIG. 7, the corrugated turbulence enhancer 36 may be substantially M-shaped, with a first trailing end 64 and a second trialing end 66 connected to a substantially V-shaped middle section 68. An apex 70 of the substantially V-shaped middle section 68 of the corrugated turbulence enhancer 36 can form a trailing middle section. A furrow 72 of the substantially V-shaped middle section 68 of the corrugated turbulence enhancer 36 may be associated with the injection tube 12. The first and second trailing ends 64 and 66 of the corrugated turbulence enhancer 36 are at an angle 74 relative to the flow of flue gas 16, such as an approximate thirty-two (32) degree angle.

FIG. 8 illustrates another example of the corrugated turbulence enhancer 36 of the ammonia injection grid 10. As shown in FIG. 8, the corrugated turbulence enhancer 36 may be associated with the downstream side of each injection tube 12. The corrugated turbulence enhancer 36 may include a first leading end 80 joined to the first trailing end 66 and a second leading end 82 joined to the second trailing end 64. As shown, the corrugated turbulence enhancer 36 may be in the form of three (3) contiguous, substantially V-shapes. The two (2) outer V-shapes of the corrugated turbulence enhancer may form an angle 78, which may be approximately one-hundred (100) degrees. Further, an angle 76 between the apex 70 of the substantially V-shaped middle section 68 of the corrugated turbulence enhancer 36 and the apex of each of the substantially V-shaped outer sections may be approximately one-hundred and sixteen (116) degrees. The addition of the first leading end 80 and the second leading end 82 to the corrugated turbulence enhancer 36 further enhances the turbulent wake downstream of the injection tubes 12, resulting in an increased mixing efficiency between the injected ammonia and the flow of flue gas 16. As shown in FIG. 6, the V-shaped baffle plates 52 have sound adsorption material 22 being situated along their external surfaces for enhance noise suppression. The sound adsorption material 22 can be porous material 24 or a combination of porous material 24 covered by perforated metal material 26 to further enhance the noise suppression of the AIG 10 for superior operational efficiency.

The corrugated turbulence enhancer 36 covered by sound adsorption material 22 of the AIG 10 dramatically increases mixing efficiency, reduces the mixing distance and reduces the exhaust gas stack length by elimination of the muffler as shown in FIG. 9. This reduction and increased efficiency allows for a compact SCR system and provides a significant capital cost reduction. The corrugated turbulence enhancer 36 covered by sound adsorption material 22 disclosed herein allows for a low downstream pressure drop to further increase the overall efficiency of the SCR system. In addition, the corrugated turbulence enhancer 36 disclosed herein may be retrofitted to existing ammonia injection grids to achieve the benefits discussed above. The corrugated turbulence enhancer 36 may be secured to existing ammonia injection grids on the downstream side of the injection tubes 12.

The entire ammonia injection grid may be constructed to be mounted on a skid to be easily transported to a desired location.

Whereas, the devices and methods have been described in relation to the drawings and claims, it should be understood that other and further modifications, apart from those shown or suggested herein, may be made within the spirit and scope of this invention.

What is claimed is:

1. An ammonia injection grid, comprising:
an injection tube and sound adsorption material, said injection tube having at least one nozzle for injecting ammonia into a flow of flue gas, wherein said injection tube extends generally transverse to the flow of flue gas and said sound adsorption material being situated along the external surface of said injection tube such that the sound adsorption material allows said nozzle to inject ammonia into the flow of flue gas while providing noise suppression.

2. The ammonia injection grid of claim 1 wherein said ammonia injection grid further comprises a plurality of horizontal baffle plates, said baffle plates attached to the upstream side of said injection tube for creating turbulent mixing and said sound adsorption material being situated along the external surface of said baffle plates to enhance both the turbulent mixing and noise suppression.

3. The ammonia injection grid of claim 2 wherein said sound adsorption material comprises amorphous wool such as alcaline-earth-silicate (AES) wool or aluminium-silicate (ASW) wool, polycrystalline (PCW) wool such as alumina wool, amorphous paper, PCW paper, polyurethane, elastomeric foam, open-celled polymeric foam or a combination of amorphous wool, PCW wool, amorphous paper, PCW paper, polyurethane, elastomeric foam or open-celled polymeric foam.

4. The sound adsorption material of claim 3 further comprising a perforated metal material over said amorphous wool, said PCW wool, said amorphous paper, said PCW paper, said polyurethane, said elastomeric foam, said open-celled polymeric foam or said combination of amorphous wool, PCW wool, amorphous paper, PCW paper, polyurethane, elastomeric foam or open-celled polymeric foam.

5. The ammonia injection grid of claim 1 wherein said ammonia injection grid further comprises a corrugated turbulence enhancer, said corrugated turbulence enhancer associated with said injection tube to generate turbulent wake in order to enhance turbulent mixing and said sound adsorption material being situated along the external surface of said corrugated turbulence enhancer to enhance noise suppression.

6. The ammonia injection grid of claim 5 wherein said injection tube comprises a plurality of elongated, circular injection tubes aligned in parallel, wherein each said injection tube is provided with a plurality of nozzles, wherein said corrugated turbulence enhancer comprises a plurality of corrugated turbulence enhancers associated with each said injection tube, wherein said sound adsorption material being situated along the external surface of said injection tubes such that the sound adsorption material allows said nozzles to inject ammonia into the flow of flue gas; and wherein said sound adsorption material being situated along the external surface of said corrugated turbulence enhancers.

7. The ammonia injection grid of claim 6 wherein said sound adsorption material comprises amorphous wool such as alcaline-earth-silicate (AES) wool or aluminium-silicate (ASW) wool, polycrystalline (PCW) wool such as alumina wool, amorphous paper, PCW paper, polyurethane, elastomeric foam, open-celled polymeric foam or a combination of amorphous wool, PCW wool, amorphous paper, PCW paper, polyurethane, elastomeric foam or open-celled polymeric foam.

8. The sound adsorption material of claim 7 further comprising a perforated metal material over said amorphous wool, said PCW wool, said amorphous paper, said PCW paper, said polyurethane, said elastomeric foam, said open-celled polymeric foam or said combination of amorphous wool, PCW wool, amorphous paper, PCW paper, polyurethane, elastomeric foam or open-celled polymeric foam.

9. The ammonia injection grid of claim 6 wherein each of the nozzles forms an approximate 75 degree angle relative to the flow of flue gas.

10. The ammonia injection grid of claim 5 comprising at least one upper ammonia injection grid panel and at least one lower injection grid panel wherein said upper ammonia injection grid panel having said sound adsorption material being situated along the external surface of said upper ammonia injection grid panel and wherein said lower ammonia injection grid panel having said sound adsorption material being situated along the external surface of said lower ammonia injection grid panel.

11. The ammonia injection grid of claim 5 comprising a plurality of ammonia injection grid panels wherein said ammonia injection grid panels having said sound adsorption material being situated along the external surface of said ammonia injection grid panels.

12. The ammonia injection grid of claim 11 wherein said sound adsorption material comprises amorphous wool such as alcaline-earth-silicate (AES) wool or aluminium-silicate (ASW) wool, polycrystalline (PCW) wool such as alumina wool, amorphous paper, PCW paper, polyurethane, elastomeric foam, open-celled polymeric foam or a combination of amorphous wool, PCW wool, amorphous paper, PCW paper, polyurethane, elastomeric foam or open-celled polymeric foam.

13. The sound adsorption material of claim 12 further comprising a perforated metal material over said amorphous wool, said PCW wool, said amorphous paper, said PCW paper, said polyurethane, said elastomeric foam, said open-celled polymeric foam or said combination of amorphous wool, PCW wool, amorphous paper, PCW paper, polyurethane, elastomeric foam or open-celled polymeric foam.

14. The ammonia injection grid of claim 5 further comprising an upper header and a lower header in fluid communication with the injection tube for supplying ammonia to the injection tube wherein upper header having said sound adsorption material being situated along the external surface of said upper header and wherein lower header having said sound adsorption material being situated along the external surface of said lower header.

15. The ammonia injection grid of claim 14 wherein the upper header and the lower header are provided with a substantially V-shaped baffle plate wherein said V-shaped baffle plate having said sound adsorption material being situated along the external surface of said V-shaped baffle plate.

16. The ammonia injection grid of claim 15 wherein said substantially V-shaped baffle plate of said upper header and said lower header form an approximate 44 degree angle relative to the flow of flue gas wherein said V-shaped baffle plate having sound adsorption material received on the outside of said V-shaped baffle plate.

17. The ammonia injection grid of claim 16 wherein said sound adsorption material comprises amorphous wool such as alcaline-earth-silicate (AES) wool or aluminium-silicate (ASW) wool, polycrystalline (PCW) wool such as alumina wool, amorphous paper, PCW paper, polyurethane, elastomeric foam, open-celled polymeric foam or a combination of amorphous wool, PCW wool, amorphous paper, PCW paper, polyurethane, elastomeric foam or open-celled polymeric foam.

18. The sound adsorption material of claim 17 further comprising a perforated metal material over said amorphous wool, said PCW wool, said amorphous paper, said PCW paper, said polyurethane, said elastomeric foam, said open-celled polymeric foam or said combination of amorphous wool, PCW wool, amorphous paper, PCW paper, polyurethane, elastomeric foam or open-celled polymeric foam.

19. The ammonia injection grid of claim 15 comprising a nozzle in the upper header and a nozzle of the lower header, wherein the nozzle of the upper header and the nozzle of the lower header inject ammonia are substantially perpendicular to the flow of flue gas.

20. The ammonia injection grid of claim 5 wherein said corrugated turbulence enhancer is associated with a downstream side of the injection tube.

21. The ammonia injection grid of claim 5 wherein the corrugated turbulence enhancer comprises a first trailing end and a second trailing end connected to a substantially V-shaped middle section.

22. The ammonia injection grid of claim 21 wherein an apex of the substantially V-shaped middle section forms a trailing middle section.

23. The ammonia injection grid of claim 21 wherein the injection tube is associated with a furrow of the substantially V-shaped middle section of the corrugated turbulence enhancer.

24. The ammonia injection grid of claim 21 wherein the first trailing end and the second trailing end of the corrugated turbulence enhancer form an approximate 32 degree angle relative to the flow of flue gas.

25. The ammonia injection grid of claim 21 further comprising a first leading end joined to the first trailing end and a second leading end joined to the second trailing end.

26. The ammonia injection grid of claim 5 wherein the corrugated turbulence enhancer is substantially M-shaped.

27. The ammonia injection grid of claim 5 wherein the corrugated turbulence enhancer is formed from three contiguous, substantially V-shaped sections.

28. An ammonia injection grid for a selective catalytic reduction (SCR) system, comprising:
   sound adsorption material;
   a plurality of elongated, circular injection tubes, each injection tube having a plurality of nozzles for injecting ammonia into a flow of flue gas wherein each injection tube extends generally transverse to the flow of flue gas and wherein said injection tubes having said sound adsorption material being situated along the external surface of said injection tubes such that the sound adsorption material allows said nozzles to inject ammonia into the flow of flue gas;
   a plurality of corrugated turbulence enhancers associated with a downstream side of each injection tube to generate turbulent wake to enhance turbulent mixing of the injected ammonia and flue gas and wherein each said corrugated turbulence enhancer having said sound adsorption material being situated along the external surface of said corrugated turbulence enhancer to enhance noise suppression; and
   a header in fluid communication with each injection tube for supplying the ammonia wherein said header having said sound adsorption material being situated along the external surface of said header to enhance noise suppression.

29. The ammonia injection grid of claim 28 wherein said sound adsorption material comprises amorphous wool such as alcaline-earth-silicate (AES) wool or aluminium-silicate (ASW) wool, polycrystalline (PCW) wool such as alumina wool, amorphous paper, PCW paper, polyurethane, elastomeric foam, open-celled polymeric foam or a combination of amorphous wool, PCW wool, amorphous paper, PCW paper, polyurethane, elastomeric foam or open-celled polymeric foam.

30. The sound adsorption material of claim 29 further comprising a perforated metal material over said amorphous wool, said PCW wool, said amorphous paper, said PCW paper, said polyurethane, said elastomeric foam, said open-celled polymeric foam or said combination of amorphous wool, PCW wool, amorphous paper, PCW paper, polyurethane, elastomeric foam or open-celled polymeric foam.

31. The ammonia injection grid of claim 29 wherein each corrugated turbulence enhancer is substantially M-shaped or is formed from three contiguous, substantially V-shaped sections.

32. The ammonia injection grid of claim 29 comprising a substantially V-shaped baffle plate connected to the header wherein said V-shaped baffle plate having said sound adsorption material being situated along the external surface of said V-shaped baffle plate.

33. The ammonia injection grid of claim 29 wherein each injection tube is associated with a middle section of each of the corrugated turbulence enhancers respectively.

34. The ammonia injection grid of claim 29 wherein the ammonia injection grid comprises a plurality of ammonia injection grid panels wherein said ammonia injection grid panels having said sound adsorption material being situated along the external surface of said ammonia injection grid panels.

35. The ammonia injection grid of claim 30 wherein each corrugated turbulence enhancer is substantially M-shaped or is formed from three contiguous, substantially V-shaped sections.

36. The ammonia injection grid of claim 30 comprising a substantially V-shaped baffle plate connected to the header wherein said V-shaped baffle plate having said sound adsorption material being situated along the external surface of said V-shaped baffle plate.

37. The ammonia injection grid of claim 30 wherein each injection tube is associated with a middle section of each of the corrugated turbulence enhancers respectively.

38. The ammonia injection grid of claim 30 wherein the ammonia injection grid comprises a plurality of ammonia injection grid panels wherein said ammonia injection grid panels having said sound adsorption material being situated along the external surface of said ammonia injection grid panels.

\* \* \* \* \*